(12) United States Patent
Bacher et al.

(10) Patent No.: US 7,108,500 B2
(45) Date of Patent: Sep. 19, 2006

(54) PROCESS AND APPARATUS FOR RECYCLING OF PET-MATERIAL

(76) Inventors: Helmut Bacher, Schmidbergerweg 5, St. Florian A-4490 (AT); Helmuth Schulz, Hirschgasse 16/12, Linz A-4020 (AT); Georg Wendelin, Waldbothenweg 84, Linz A-4033 (AT)

( * ) Notice: Subject to any disclaimer, the term of this patent is extended or adjusted under 35 U.S.C. 154(b) by 0 days.

(21) Appl. No.: 10/853,998

(22) Filed: May 25, 2004

(65) Prior Publication Data

US 2004/0219247 A1 Nov. 4, 2004

Related U.S. Application Data

(62) Division of application No. 10/088,951, filed on Mar. 22, 2002, now Pat. No. 6,784,214.

(30) Foreign Application Priority Data

Sep. 22, 1999 (AT) .................................... 1620/99
Sep. 22, 2000 (WO) ...................... PCT/AT00/00255

(51) Int. Cl.
*B28B 17/02* (2006.01)

(52) U.S. Cl. ...................... 425/202; 425/197; 425/198; 425/199; 425/144; 264/37.1; 264/37.25; 264/37.31

(58) Field of Classification Search ................ 425/202, 425/197–199, 144; 366/151; 264/37.1, 264/37.25, 37.31
See application file for complete search history.

(56) References Cited

U.S. PATENT DOCUMENTS

| | | | | |
|---|---|---|---|---|
| 4,721,448 A | * | 1/1988 | Irish et al. | 425/144 |
| 5,182,066 A | * | 1/1993 | Marin | 264/169 |
| 5,225,137 A | * | 7/1993 | Sadr | 264/349 |
| 5,407,624 A | * | 4/1995 | Engh et al. | 264/141 |
| 5,509,795 A | * | 4/1996 | Near et al. | 425/4 C |
| 5,536,154 A | * | 7/1996 | Bacher et al. | 425/302.1 |
| 5,750,158 A | * | 5/1998 | Wissmann et al. | 425/144 |
| 5,756,129 A | * | 5/1998 | Yoshii et al. | 425/185 |
| 5,950,936 A | * | 9/1999 | Bergart | 241/21 |
| 6,126,099 A | * | 10/2000 | Fachinger et al. | 241/81 |
| 6,279,471 B1 | * | 8/2001 | Reddoch | 100/37 |

(Continued)

FOREIGN PATENT DOCUMENTS

DE 1957333 A 12/1970

(Continued)

*Primary Examiner*—Robert Davis
*Assistant Examiner*—G. Nagesh Rao
(74) *Attorney, Agent, or Firm*—Townsend and Townsend and Crew LLP

(57) ABSTRACT

Within a process for recycling of PET-material and/or objects of PET, the PET-material to be processed is heated and dried in the course of a pre-treatment step and simultaneously is crystallized at elevated temperature. This pre-treatment step is followed by a main-treatment step under vacuum. In this main-treatment step, the processed material is again dried and crystallized at a temperature that is higher than the temperature of the pre-treatment step. Preferably, also in the main-treatment step no plasticizing of the material takes place; the plasticizing or, respectively, melting of the material takes place only after the main-processing step.

An apparatus for performing this process comprises a pre-processing device (3) in which the processed material is dried and simultaneously crystallized at elevated temperature, and, if desired, is also comminuted. A main-processing device (4) is connected to this pre-processing device (3), in which main-processing device the supplied PET-material is dried, crystallized and heated to a temperature that is higher than the temperature within the pre-treatment device.

40 Claims, 2 Drawing Sheets

U.S. PATENT DOCUMENTS 6,405,579 B1 * 6/2002 Tjahjadi et al. ............ 73/54.11

FOREIGN PATENT DOCUMENTS

| | | |
|---|---|---|
| DE | 274436 A | 12/1989 |
| EP | 0074346 A | 3/1983 |
| EP | 0379684 A | 8/1990 |
| EP | 0698462 A | 2/1996 |
| EP | 0779136 A | 6/1997 |
| EP | 779136 A2 * | 6/1997 |
| WO | 9318902 A | 9/1993 |

* cited by examiner

PROCESS AND APPARATUS FOR RECYCLING OF PET-MATERIAL

This application is a division of U.S. application Ser. No. 10/088,951 filed Mar. 22, 2002; now U.S. Pat. No. 6,784,214. This application also claims foreign priority from Austrian application 1620/99 filed Sept. 22, 1999 and PCT/AT00/00255 filed Sept. 22, 2000.

BACKGROUND OF THE INVENTION

The invention relates to a process and an apparatus for recycling of PET-material.

Under PET-material (material of polyethylene terephthalate) all PET-materials and/or PET-objects are to be understood, also those of BOPET (bi-oriented PET), in particular pieces, milled bottle material, foils, fibers, flakes and the like.

When recycling articles of polyethylene terephthalate or of polyethylene terephthalate materials it is of importance that the PET-material to be recycled is as dry as possible in order to avoid a hydrolytic degradation of the molecule chains by the influence of hydrogen during plastifying or during the melting step. However, an efficient drying is possible only at elevated temperature at which the amorphous PET-particles or PET-parts adhere to each other. For these reasons, a crystallization of the PET-material should be obtained before drying. Such a crystallization can be obtained by uniformly moving or mechanically treating the particles at a temperature lower than the drying temperature, in any case at a temperature that is lower than the plastifying temperature.

However, since the PET-materials to be recycled or the articles consisting of PET, in particular PET-bottles, are mostly soiled and are washed and possibly previously comminuted, at which procedure a simultaneous soiling frequently cannot be avoided, in most cases the material is discretely comminuted or milled, washed and dried. Such a pre-drying should be at least so efficient that the moisture content does not exceed a value of 1.5 weight- % of the PET-material to be treated or to be recycled.

SUMMARY OF THE INVENTION

In particular, it is an object of the invention to provide for a process and an apparatus of the initially described kind by which PET-material is subjected to a quick recycling that is as power saving as possible, wherein the PET-granulate produced from the melt obtained, or PET-articles made therefrom, have high viscosity values, in particular a viscosity that can be compared with the viscosity values of the PET-material to be recycled. Further, the obtained melt or, respectively, the PET-granulate produced from the melt should meet the rules concerning food stuff techniques, which means that harmful substances or contaminations contained in the PET-material that is supplied to the recycling process are eliminated as far as possible by a suitable treatment.

This object is achieved within a process and the apparatus of the present invention.

Therefore, a two-step treatment of the delivered or supplied PET-material is made, wherein, when pre-treating in a pre-treatment apparatus, no plastification of the PET-material is made, however a crystallization and a certain pre-densification at a simultaneous drying takes place. The pre-densification is obtained by a suitable temperature by mechanical treatment of the PET-material or by power introduction into it. In particular, increasing or controlling of the temperature is made by the mechanical treatment of the PET-material or, respectively, by conversion of the rotational energy of at least one revolving mixing and/or comminuting element into thermic energy by reasons of the friction losses occurring.

During the main treatment in a main treatment apparatus, the PET-material is further dried and crystallized at an elevated temperature and is kept under a high vacuum for a certain mean dwell time. Again there is a mechanical treatment or material condensation and introduction of power by at least one revolving mixing and/or comminuting element that by its rotation introduces the corresponding thermic energy into the PET-material and further heats it.

The main treatment that is effected under vacuum reduces the remaining humidity to a predetermined defined mean value and also has the effect that volatile harmful substances are separated from the PET-material.

The temperature at the main treatment is kept below the melting temperature of the PET-material, in particular about 40 to 60° C. below the melting temperature. However it is desired to keep this temperature as high as possible.

Only after the main treatment, the PET-material conveyed off is plasticized by an extruder that preferably is directly connected to the main treatment apparatus. By the direct, vacuum-tight connection, the vacuum within the main treatment apparatus can act into the inlet section of the extruder. This extruder comprises a plasticizing zone followed by a compression and damming zone. This damming zone is followed by a degassing or evacuating zone in which volatile substances are sucked off from the melt by a vacuum, in particular by a high vacuum. Within this, a one-step or multi-step degassing can be provided. It is also possible to provide a plurality of compression zones and decompression zones having different values of the vacuum one after the other. Thereby also persistent contaminations or those which are difficult to vaporize can be vaporized off.

By a suitable selection of the temperatures and of the dwell times within the pre-treatment apparatus and within the main treatment apparatus, the viscosity value of the melt obtained from the extruder and of the PET-granulate produced from the melt can be adjusted. By suitably long dwell times and suitably high temperatures within the vacuum, a positive influence onto the viscosity is effected or, respectively, a re-polymerization takes place.

Advantageous embodiments of the invention can be seen from the following description and the drawing. In the drawing, two exemplary embodiments of the invention are shown.

DESCRIPTION OF THE PREFERRED EMBODIMENTS

Figure 1:
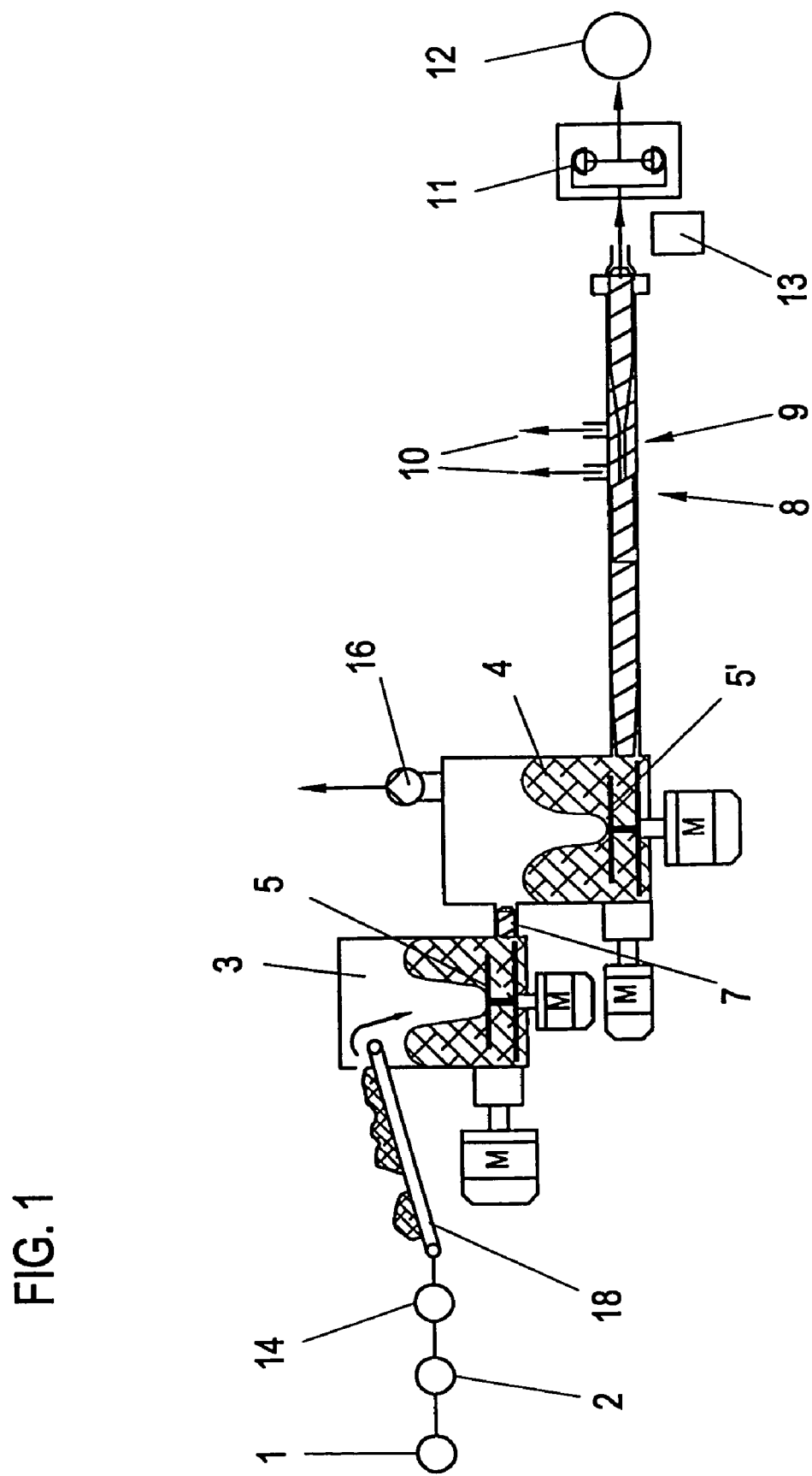
FIG. 1 shows an embodiment of the invention in which the PET-material is directly supplied from the pre-treatment apparatus to the main treatment apparatus.

PET to be recycled, in particular PET-material and/or objects of PET, can be comminuted within a comminuting unit 1 and can be supplied via a washing unit 2 to a unit 14 for pre-drying. Used PET-bottles and PET-containers to be recycled are in an advantageous manner pre-sorted and are pre-milled to an average size of about 15 to 25 mm. The residual humidity of this milled, washed and dried PET-material should be the least possible by reason of process technology and should amount to 1.5% by weight maximally.

For the pre-treatment, the PET-material is supplied to a pre-processing apparatus 3 for pre-drying, in which it can be also comminuted, if desired. Within the pre-processing apparatus 3 a heating and a crystallization of the material takes place simultaneously with drying. For this, within the pre-treatment apparatus 3 a rotating mixing and/or comminuting element 5 is provided that rotates with a circumferential speed of 9 to 15 m/s. Thereby it is ensured that the mechanical motor power is converted into heat by friction between the mixing tools and the PET-pieces or the PET-material. The throughput of the PET-material is so controlled that its average dwell-time amounts to about 35 to 65 min, preferably 40 to 60 min. Within this, the temperature of the PET-material is adjusted to about 140 to 190° C., preferably 150 to 160° C. At this temperature, the surface water evaporates immediately and due to the long dwell-time also a substantial portion of the absorbed humidity or other absorbed contamination escapes. It is not absolutely necessary, however it is of advantage if processing of the PET-material within the pre-processing apparatus 3 is made under vacuum. Thereby, the dwell-time of the PET-material within the pre-processing apparatus 3 can be decreased, or, respectively, the volume of this apparatus can be correspondingly reduced. Such processing in particular is then justified if the material to be processed should be highly protected against oxidation, or, respectively, if comminuting within the pre-processing unit 3 is not necessary.

Figure 2:
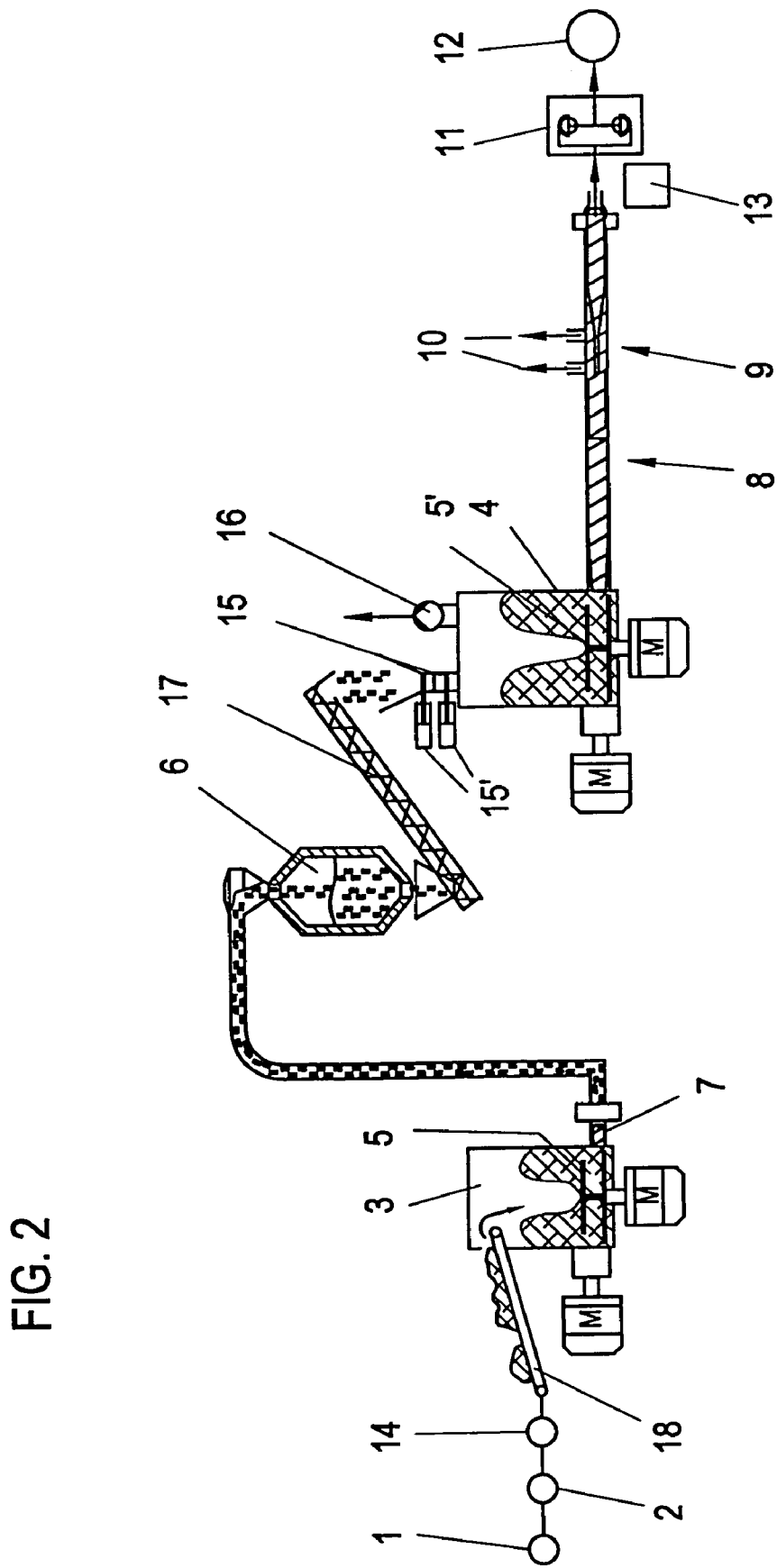
FIG. 2 shows an embodiment of the invention in which the PET-material is supplied from the pre-treatment apparatus to the main treatment apparatus via an intermediate storage means.

From the pre-treatment apparatus 3, to which the PET-material is supplied, preferably continuously, in particular by a supplying unit 18, for example a conveyor belt, the PET-material is conveyed off by a conveyor unit 7, in particular a conveyor screw. It can be conveyed directly (FIG. 1) or via an intermediate storage means 6 (FIG. 2) and via a further conveyor unit, for example a conveyor screw 17, to a main-processing apparatus 4.

Preferably, the main-processing apparatus 4 is supplied with heated PET-material.

The conveyor unit 7 is filled by the pre-processing apparatus 3 and is kept at a temperature of 140 to 170° C., in particular 150 to 160° C.

Within the main-processing apparatus 4, the particles of PET-material, which partially loosely adhere to each other, are mainly broken into pieces by a rotating mixing and/or comminuting element 5', and the temperature of the synthetic plastic material is increased to 170 to 210° C., in particular 180 to 210° C. The circumferential speed of the mixing and/or comminuting element 5' corresponds substantially to the circumferential speed of the mixing and/or comminuting element 5 within the pre-processing apparatus 3 and also amounts to about 9 to 15 m/s.

The volume of the receptacle of the main-processing device 4 and the throughput of the material are so chosen that an average dwell-time for the PET-material of 40 to 90 min, in particular 50 to 90 min, is obtained. The pressure within the main-processing apparatus 4 is adjusted to a value of less than 20 mbar, preferably, for obtaining best results, to less than 10 mbar.

Filling of the main-processing apparatus 4 can be made directly by means of the screw 7 or by means of a sluice device 15, which operates with two gas-tight or vacuum-tight slide gates 15' and thus introduces the PET-material in batch quantities. A vacuum pump 16 is connected to the main-processing apparatus 4.

An extruder 8 is connected to the main-processing apparatus 4 and further processes the PET-material delivered from the main-processing device 4. Within the extruder 8, the PET-material is plasticized or molten. The extruder 8 may comprise at least one degassing zone 9, whereby a vacuum pump 10 is connected to the degassing opening in the extruder housing in order to adjust a pressure of less than 10 mbar, in particular less than 5 mbar. By providing at least one degassing zone and, if desired, applying vacuum, the separation of humidity and/or other separation products can be influenced. Preferably, the extruder 8 comprises a double degassing zone.

It has been shown that if the above-mentioned processing parameters are observed, a viscosity value of the molten PET-material or of the PET-granulate could be obtained that was about 5% above the viscosity values of the supplied PET-material. This viscosity increase could be obtained in particular by the two-step processing as well as by the corresponding adjustment of temperature, dwell-times, vacuum pressures and number of vacuum zones or degassing zones. It has further been shown that besides the humidity other separation products could also be separated within the extruder by suitably adjusting temperature, pressure, dwell-times and shearing.

Within a preferred embodiment of the invention, the extruder 8 is connected gas-tightly to the main-processing apparatus 4 so that the vacuum of the main-processing apparatus 4 acts into the extruder inlet.

A screening or filtration device 11 may be connected to the extruder 8, and the melt passing through it is supplied to a device 12 for the production of PET-granulate. Between the extruder 8 and the filtration device 11 a device 13 for measuring the viscosity of the obtained melt can be disposed.

It is of advantage if the PET-material is conveyed from the pre-processing apparatus 3 to the main-processing apparatus 4 under exclusion of air in order to exclude that the pre-dried PET-material is moistened again.

In order to avoid that the vacuum applied to the extruder 8, in particular within the degassing zones, acts back to the main-processing apparatus 4, provisions are to be made that the compression within the extruder 8, or the tightening action of the material conveyed by the extruder, are so great that any reaction of the vacuum to the main-processing device 4 is avoided. The same holds for a reaction of the vacuum of the main-processing apparatus 4 to the pre-processing apparatus 3. In this case, however, a reaction can be excluded by providing the sluice with suitable sluice sliding gates 15'. If the pre-processing apparatus 3 is directly connected to the main-processing apparatus 4, the conveying screw must be vacuum-tight.

When supplying to the main-processing apparatus 4, the supplied PET-material is within the sluice that is predisposed with respect to the main-processing apparatus 4, which has already been subjected to the vacuum so that no substantial pressure decrease can take place within the main-processing apparatus 4. This is of advantage because the amount of the vacuum has a direct influence on the separation of the harmful substances and on the viscosity.

When an intermediate storage means 6 (FIG. 2) is used, an irregular supply of the pre-processing apparatus 3 can be tolerated.

Mostly it is sufficient to obtain the temperature increase of the supplied PET-material within the pre-processing device 3 and within the main-processing device 4 by the introduction of power by means of the rotating mixing and/or comminuting elements 5, 5'. In addition, the pre-processing device 3 and/or the main-processing device 4 may also be heated.

In the course of the pre-treatment and of the main treatment, the PET-material can also be comminuted. The mixing and/or comminuting elements have then to be correspondingly constructed.

The drive means for the mixing and/or comminuting elements 5, 5' or, respectively, for the conveyor means 7, 17 or, respectively, for the extruder 8 are not shown or have been designated by M, respectively.

The invention claimed is:

1. Apparatus for recycling of PET-material, in which the PET-material to be processed is dried, crystallized and at least one of plasticized and molten, and the melt is processed to one of PET-granulate and PET-articles, and for performing a process having first and second processing steps, the apparatus comprising a pre-processing device for carrying out the first step of pre-processing the supplied PET-material having rotatable mechanical processing elements for drying and simultaneously crystallizing the PET-material at elevated temperature and an evacuable main-processing device for carrying out the second processing step, the evacuable main-processing device having mechanical processing elements for further drying, crystallizing and temperature increase of the PET-material supplied by the pre-processing device, a screw conveyor for transporting the PET-material from the pre-processing device to the main-processing device, means for controlling the temperature of the PET-material obtained by rotational energy of the processing elements, a further device for at least one of plasticizing and melting the material after the second processing step, the further device being arranged downstream of the main-processing device, a filtration device for filtering the PET-material arranged downstream of the further device for at least one of plasticizing and melting the PET-material, and a pressure reducer for maintaining a pressure of less than 150 mbar in the main-processing device.

2. Apparatus according to claim 1, characterized in that the pre-processing device comminutes the PET-material.

3. Apparatus according to claim 1, including at least one rotating mixing and/or comminuting element located within the pre-processing device and within the main-processing device for mechanically treating and heating the PET-material.

4. Apparatus according to claim 3, including at least one mixing and comminuting element associated with the pre-processing device and adapted to rotate with a circumferential speed of 9 to 15 m/s and at least one mixing and comminuting element associated with the main-processing device and adapted to rotate with a circumferential speed of also 9 to 15 m/s.

5. Apparatus according to claim 3 adapted to comminute one of PET-foils, PET-fibers and PET-flakes, and further including at least one mixing and comminuting element within each of the pre-processing device and the main-processing device adapted to rotate with a circumferential speed of 15 to 35 m/s.

6. Apparatus according to claim 1, characterized in that an intermediate storage means is inserted between the pre-processing device and the main-processing device, the volume of the storage means corresponding to 100 to 200% of the volume of the pre-processing device.

7. Apparatus according to claim 6, characterized in that between the pre-processing device and the intermediate storage means and between the intermediate storage means and the main-processing device a thermically isolated and/or heated conveyor unit each is provided.

8. Apparatus according to claim 1, characterized in that the volume of the main-processing device amounts to 80 to 200% of the volume of the pre-processing device.

9. Apparatus according to claim 1, wherein the device for at least one of plasticizing and melting comprises an extruder connected to the main-processing device and adapted to take the PET-material from the main-processing device for heating the PET-material to a temperature of 260 to 275° C. for plasticizing or melting the material.

10. Apparatus according to claim 9, characterized in that the extruder is gas-tightly or, respectively, vacuum-tightly connected to the main-processing device and that the pressure within the inlet section of the extruder is connected to the pressure within the interior of the main-processing device, or, respectively, that the pressure within the main-processing apparatus corresponds to the pressure within the inlet section of the extruder.

11. Apparatus according to claim 9, including a vacuum pump, the extruder comprising at least one de-gassing zone connected to the vacuum pump for adjusting a pressure within the de-gassing zone to less than 40 mbar.

12. Apparatus according to claim 1, characterized in that the filtration device for PET-melt is connected to the extruder and that a device for producing finished products or semi-finished products is connected to the filtration device.

13. Apparatus according to claim 1, characterized in that between the device for at least one of plasticizing and melting and the filtration device a measuring device for measuring the viscosity of the melt is disposed.

14. Apparatus according to claim 1, characterized in that additional heating for the pre-processing device and/or for the main-processing device is provided.

15. Apparatus for recycling PET-material and heating the PET-material by subjecting the PET-material to movement in first and second processing steps, comprising a pre-processing device for the first step for pre-processing of the PET-material and having rotatable mechanical processing elements for drying and simultaneously crystallizing and increasing the temperature of the PET-material at an elevated temperature, a main-processing device for the second step for main processing the PET-material including an evacuator adapted to establish a vacuum in the main-processing device and mechanical processing elements for further drying and crystallizing the PET-material supplied by the pre-processing device, a screw conveyor for transporting the PET-material from the pre-processing device to the main-processing device, means for controlling the temperature of the PET-material obtained by the rotational energy of the processing elements, a further device for at least one of plasticizing and melting the material after the second processing step, the further device being arranged downstream of the main-processing device, a filtration device for filtering the PET-material, the filtration device being arranged downstream of the further device for at least one of plasticizing and melting the PET-material, and a pressure reducer for maintaining a pressure of less than 150 mbar in the main-processing device.

16. Apparatus according to claim 15, wherein the pre-processing device comprises processing elements for comminuting the PET-material.

17. Apparatus according to claim 15, wherein the mechanical processing elements of the pre-processing device and of the main-processing device each comprise at least one of a rotating mixing element and a rotating comminuting element each which mechanically process and heat the PET-material.

18. Apparatus according to claim 17, including at least one mixing element and one comminuting element in each of the pre-processing device and the main-processing device adapted to rotate with a circumferential speed of between 9 to 15 m/s.

19. Apparatus according to claim 17 adapted to comminute at least one of PET-foils, PET-fibers and PET-flakes, the apparatus including at least one mixing element and one comminuting element within each of the pre-processing device and the main-processing device, and wherein the elements are adapted to rotate with a circumferential speed of between 15 to 35 m/s.

20. Apparatus according to claim 19, including a drive for rotating the at least one mixing element and comminuting element with a circumferential speed of between 20 to 30 m/s.

21. Apparatus according to claim 15, including an intermediate storage device inserted between the pre-processing device and the main-processing device and having a volume between 100 to 200% of a volume of the pre-processing device.

22. Apparatus according to claim 21, wherein the screw conveyor includes a conveyor unit which is at least one of thermically isolated and heated arranged between the pre-processing device and the intermediate storage device and between the intermediate storage device and the main-processing device.

23. Apparatus according to claim 22, wherein the conveyor unit comprises one of a conveyor screw and an extruder.

24. Apparatus according to claim 15, wherein a volume of the main-processing device is between 80 to 200% of a volume of the pre-processing device.

25. Apparatus according to claim 24, wherein the volume of the main-processing device is between 100 to 180% of the volume of the pre-processing device.

26. Apparatus according to claim 15, wherein the device for at least one of plasticizing and melting the material comprises an extruder connected to the main-processing device receiving the PET-material taken from the main-processing device and adapted to heat the PET-material to a temperature between 260 to 275° C. to at least one of plasticize and melt the PET-material.

27. Apparatus according to claim 26, wherein the extruder is connected to the main-processing device in a sealed manner, and wherein an inlet section of the extruder communicates with an interior of the main-processing device so that the pressure within the main-processing apparatus corresponds to the pressure within the inlet section of the extruder.

28. Apparatus according to claim 26, wherein pressure within an inlet section of the extruder and within an interior of the main-processing apparatus are equal.

29. Apparatus according to claim 26, wherein the extruder comprises at least one de-gassing zone and a vacuum pump connected thereto adapted to maintain a pressure in the de-gassing zone of less than 40 mbar.

30. Apparatus according to claim 29, wherein the vacuum pump is adapted to maintain a pressure within the de-gassing zone of less than 10 mbar.

31. Apparatus according to claim 26, wherein the filtration device is directly connected to the extruder for filtering the PET-material.

32. Apparatus according to claim 31, including a product device for producing one of finished products and semi-finished products connected to the filtration device.

33. Apparatus according to claim 32, wherein the product device is adapted to produce PET-granulate.

34. Apparatus according to claim 31, including a measuring device between the extruder and the filtration device for measuring a viscosity of the plasticized or melted PET-material.

35. Apparatus according to claim 15 wherein the pressure reducer is adapted to maintain the pressure in the main-processing device to less than 20 mbar.

36. Apparatus according to claim 15, including an additional heating device for at least one of the pre-processing device and the main-processing device.

37. Apparatus for recycling of PET-material, in which the PET-material to be processed is dried, crystallized and at least one of plasticized and molten, and the melt is processed to one of PET-granulate and PET-articles, and for performing a process having first and second processing steps, the apparatus comprising a pre-processing device for carrying out the first step of pre-processing the supplied PET-material having rotatable mechanical processing elements for drying and simultaneously crystallizing the PET-material at elevated temperature and a main-processing device for carrying out the second processing step, the main-processing device having a pressure reducer adapted to establish a vacuum of less than 150 mbar in the main-processing device and mechanical processing elements for further drying, crystallizing and increasing the temperature of the PET-material supplied by the pre-processing device, a screw conveyor for transporting the PET-material from the pre-processing device to the main-processing device, means for controlling the temperature of the PET-material obtained by the rotational energy of the processing elements, a further device for at least one of plasticizing and melting the material after the second processing step, the further device being arranged downstream of the main-processing device, and a filtration device for filtering the PET-material, the filtration device being arranged downstream of the further device for at least one of plasticizing and melting the PET-material.

38. Apparatus according to claim 1 further comprising a supplying unit for supplying the PET-material to be processed into the pre-processing device, and means for evacuating the pre-processing device.

39. Apparatus according to claim 15 further comprising a supplying unit for supplying the PET-material to be processed into the pre-processing device, and means for evacuating the pre-processing device.

40. Apparatus according to claim 37 further comprising a supplying unit for supplying the PET-material to be processed into the pre-processing device, and means for evacuating the pre-processing device.

* * * * *